No. 642,599. Patented Feb. 6, 1900.
H. GEISENHÖNER.
DYNAMO ELECTRIC MACHINE.
(Application filed Nov. 7, 1898.)
(No Model.)
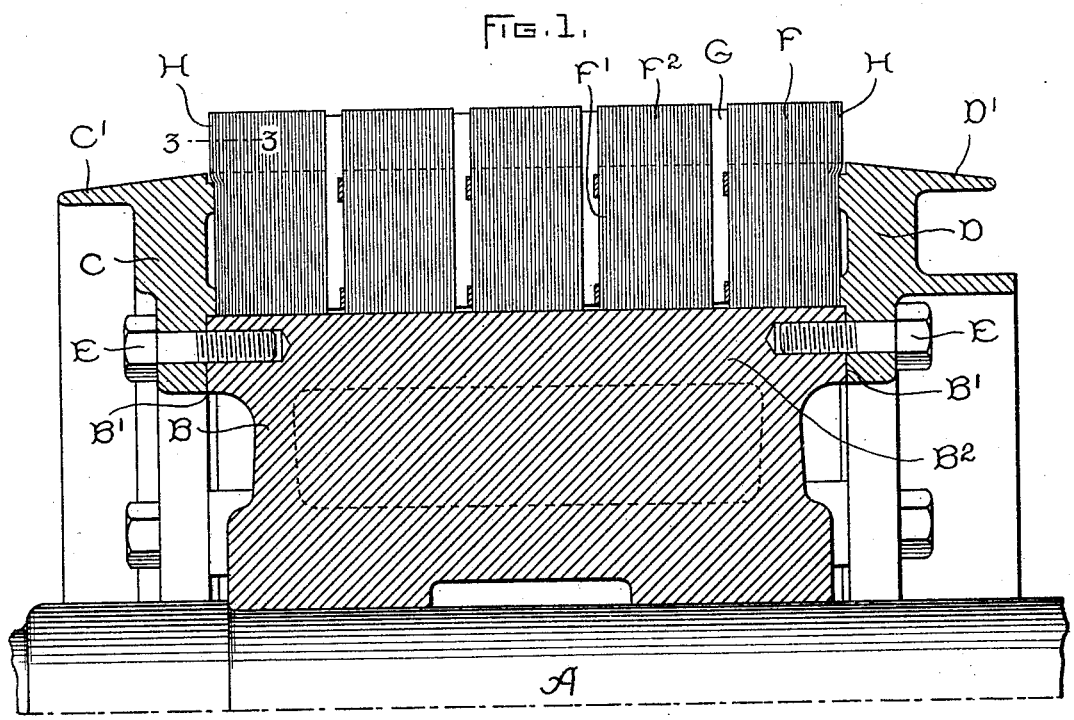
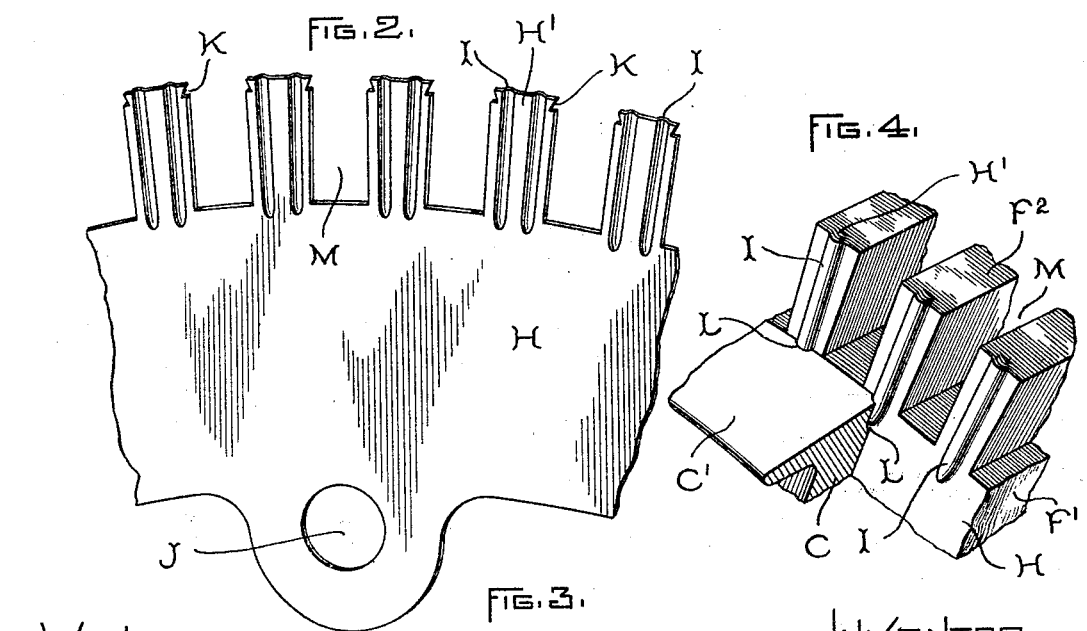
WITNESSES.
A. H. Abell.
A. F. Macdonald.
INVENTOR.
Henry Geisenhöner,
by Albert G. Davis
Atty.

UNITED STATES PATENT OFFICE.

HENRY GEISENHÖNER, OF SCHENECTADY, NEW YORK, ASSIGNOR TO THE GENERAL ELECTRIC COMPANY, OF NEW YORK.

DYNAMO-ELECTRIC MACHINE.

SPECIFICATION forming part of Letters Patent No. 642,599, dated February 6, 1900.

Application filed November 7, 1898. Serial No. 695,651. (No model.)

*To all whom it may concern:*

Be it known that I, HENRY GEISENHÖNER, a citizen of the United States, residing at Schenectady, in the county of Schenectady, State of New York, have invented certain new and useful Improvements in Dynamo-Electric Machines, (Case No. 452,) of which the following is a specification.

My invention relates to an improved construction of electric machines.

In the accompanying drawings, which illustrate an embodiment of my invention, Figure 1 is a partial longitudinal section of a rotatable armature. Fig. 2 is a perspective view of a punching. Fig. 3 is a section taken on the line 3 3 of Fig. 1, and Fig. 4 is a slight modification.

Mounted upon the shaft A and forming a support for the punchings F and H is a spider B of any suitable construction. The spider is provided with a number of arms $B^2$, and these arms, together with the two outer faces B', are faced off to receive the laminæ and the heads or clamps C and D. The heads are provided with finished surfaces, which engage with the spider-arms and also with the end punchings. These heads are retained in place by the bolts E. This particular type of machine is arranged to receive a winding, the coils of which are embedded in the slots in the punchings and project beyond the core at the ends. Therefore coil-supports C' and D' are provided, formed integral with the heads.

The punchings F, of which the main body of the armature is composed, are similar in construction, and each punching consists of a central body portion F', having a plurality of radially-extending teeth $F^2$; but in so far as my invention is concerned the shape and arrangement of the teeth are immaterial. Between the teeth are formed coil-slots M, which are arranged to receive any suitable form of winding, and near the ends of the teeth are formed notches K for receiving coil-retaining wedges.

In dynamo-electric machines as ordinarily constructed the punchings near the clamping-heads C and D are made much heavier to prevent the teeth from bending over at the points where they are unsupported by the heads; but in the present instance I have avoided the use of thickened punchings by reinforcing the teeth of the punchings H, located near the end of the armature-core by one or more ribs I, as occasion demands. These ribs, which may or may not be formed at the time the teeth H' are cut from the iron or steel blank, are formed by pressing the metal of which the punching is composed out of its normal plane. In Figs. 1 and 3 are shown the spaces which are thus formed between the hollow and the plane laminæ. I have shown the ribs as semicircular in outline; but any other suitable shape may be employed, if desired.

On the main body of each punching is a projection containing a hole J for receiving the bolt or other means employed to hold the punchings in place; but any other method of securing the punchings may be employed, if desired.

In Fig. 4 I have shown a slight modification of my invention, particularly designed for use on machines having an excessive strain on the teeth of the punchings. In this case the ribs I on the teeth extend downward below the root and into the main body of the punching a considerable distance. To prevent the heads from pressing the metal forming the ribs back into the main body of the punching, grooves L, corresponding in shape and position to the rib I, are formed in the heads and are so arranged that when the parts are assembled the ribs will be located in the grooves, and the metal between the grooves will take up the strain incident to the clamping of the heads.

The grooves L are preferably formed at the time the head is cast, so as to do away with machine-work. It is not intended that the ribs shall be subjected to pressure from the heads; but no harm will be done if such is the case, provided the pressure is not great enough to press the rib back into the main body of the metal, in which case the effect would be destroyed.

In assembling the armature one of the heads is first secured to the spider by the bolts E, then a number of the punchings having ribs I are mounted in place, with the ribs in one punching coinciding with the ribs on a second punching, then the laminæ and space-blocks G forming the main body of the armature, and, lastly, a few of the punchings having ribs and the remaining clamping-head.

In the present instance I have shown three ribbed punchings at each end; but the number may be varied, depending upon the strain to which the armature-core is subjected when assembled.

I have shown my invention in connection with an armature which is capable of rotary movement; but it is equally applicable to stationary armatures and to certain types of field-magnets.

What I claim as new, and desire to secure by Letters Patent of the United States, is—

1. As an article of manufacture, a punching for a dynamo-electric machine, consisting of a main body portion with a number of teeth or projections, each of the teeth or projections being provided, with a strengthening rib.

2. In an electric machine, the combination of a body of laminæ, teeth formed in the laminæ, heads for clamping the laminæ, and punchings for the ends of the body of laminæ also provided with teeth, each tooth having a strengthening-rib.

3. As an article of manufacture a punching for a dynamo-electric machine, consisting of a main body portion having a plurality of teeth formed at its periphery, each tooth having a strengthening-rib formed integrally therewith.

4. In an electric machine, the combination of a laminated core having a plurality of teeth formed therein, the laminæ comprising the core being divided into groups, space-blocks between the groups, heads for holding the laminæ together, and punchings located between the laminæ and the heads, also provided with teeth, each tooth having a strengthening-rib formed integral therewith.

5. In an electric machine, the combination of a core, clamping-heads for the core, and special end punchings arranged to be interposed between the clamping-heads and the core, each provided with a plurality of radial teeth, each tooth having a strengthening-rib formed integral therewith and extending to a point below the root of said teeth.

6. A laminated structure for electric machines which consists of laminæ of uniform thickness of material, each one of a series of adjacent laminæ which do not have separate supports, having corresponding strengthening-ribs formed in it so that each lamination registers with the adjacent laminæ.

7. In an electric machine, the combination of a laminated core, a ribbed end punching for the core, and a head for clamping the core having grooves formed therein which coincide with the ribs on the end punchings.

8. In an electric machine, the combination of a laminated core, special end punchings for the core having a plurality of ribs formed integrally therewith, and clamping-heads for holding the punchings having a plurality of grooves which correspond in number and arrangement to the ribs on the end punchings.

9. A laminated core for electric machines in which the end laminæ are provided with strengthening-ribs.

10. A laminated core for electric machines in which the end laminæ are of the same thickness as the other, and provided with strengthening-ribs.

11. A laminated structure for electric machines which consists of laminæ of uniform thickness of material, the laminæ which do not have separate supports being reinforced without increasing the amount of magnetic material.

12. A laminated structure for electric machines having the laminæ which are not completely supported reinforced to prevent bending, in such a manner that eddy-currents are not increased.

13. A lamina for electric machines having peripheral teeth, each of which has one or more hollow integral lateral projections.

14. A lamina for electric machines having peripheral teeth which have one or more hollow displaced portions of the same thickness as the main body of the laminæ.

15. A structure for electric machines comprising a series of laminæ having peripheral teeth, those on some laminæ having plane surfaces and those on other laminæ having hollow projections which maintain a space between adjacent laminæ.

In testimony whereof I have hereunto set my hand this 5th day of November, 1898.

HENRY GEISENHÖNER.

Witnesses:
 B. B. HULL,
 C. L. HAYNES.